United States Patent
Voigt et al.

(10) Patent No.: US 10,365,943 B2
(45) Date of Patent: Jul. 30, 2019

(54) VIRTUAL MACHINE PLACEMENT

(71) Applicant: HEWLETT PACKARD ENTERPRISE DEVELOPMENT LP, Houston, TX (US)

(72) Inventors: Douglas L. Voigt, Boise, ID (US); Scott Grumm, Boulder, CO (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 150 days.

(21) Appl. No.: 15/507,651

(22) PCT Filed: Jan. 27, 2015

(86) PCT No.: PCT/US2015/013087
§ 371 (c)(1),
(2) Date: Feb. 28, 2017

(87) PCT Pub. No.: WO2016/122462
PCT Pub. Date: Aug. 4, 2016

(65) Prior Publication Data
US 2017/0286146 A1    Oct. 5, 2017

(51) Int. Cl.
*G06F 9/455* (2018.01)
*G06F 9/46* (2006.01)
(Continued)

(52) U.S. Cl.
CPC .......... *G06F 9/45558* (2013.01); *G06F 1/266* (2013.01); *G06F 9/455* (2013.01); *G06F 9/45533* (2013.01); *G06F 9/48* (2013.01); *G06F 9/485* (2013.01); *G06F 9/4806* (2013.01); *G06F 9/4843* (2013.01); *G06F 9/4856* (2013.01);
(Continued)

(58) Field of Classification Search
CPC .. G06F 9/455; G06F 9/45533; G06F 9/45558; G06F 2009/45562; G06F 2009/4557; G06F 2009/45575; G06F 9/48; G06F 9/4806; G06F 9/4843; G06F 9/485; G06F 9/4856; G06F 9/4881; G06F 9/50;
(Continued)

(56) References Cited

U.S. PATENT DOCUMENTS 8,386,610 B2    2/2013    Yahalom et al.
2009/0106571 A1    4/2009    Low et al.
(Continued)

OTHER PUBLICATIONS

VMware Inc., "Smells Like Victory: Why VMware Wins the Software-Defined Storage War Too," (Research Paper), Jun. 25, 2014, 86 pages, available at https://doc.research-and-analytics.csfb.com/docView? sourceid=em&document_id=x575076&serialid=KaXO1baLdXday4P06mh2FtYkG9fajMEbU/HHLtVhQIQ%3D.
(Continued)

*Primary Examiner* — Charles M Swift
(74) *Attorney, Agent, or Firm* — Hewlett Packard Enterprise Patent Department

(57) ABSTRACT

Example implementations relate to defining a first placement plan to place virtual storage appliance virtual machines on servers and defining a second placement plan to place an application virtual machine on the servers. The first placement plan can place each virtual storage appliance virtual machine on a server that is connected to a storage asset used by a respective VSA virtual machine.

19 Claims, 7 Drawing Sheets

(51) Int. Cl.
  *G06F 15/173*  (2006.01)
  *G06F 9/48*  (2006.01)
  *G06F 9/50*  (2006.01)
  *G06F 1/26*  (2006.01)

(52) U.S. Cl.
  CPC .............. *G06F 9/4881* (2013.01); *G06F 9/50* (2013.01); *G06F 9/5005* (2013.01); *G06F 9/505* (2013.01); *G06F 9/5027* (2013.01); *G06F 9/5077* (2013.01); *G06F 9/5083* (2013.01); *G06F 9/5088* (2013.01); *G06F 2009/4557* (2013.01); *G06F 2009/45562* (2013.01); *G06F 2009/45575* (2013.01); *G06F 2009/45583* (2013.01); *G06F 2009/45591* (2013.01); *G06F 2009/45595* (2013.01)

(58) Field of Classification Search
  CPC ...... G06F 9/5005; G06F 9/5027; G06F 9/505; G06F 9/5083; G06F 9/5088
  See application file for complete search history.

(56) References Cited

U.S. PATENT DOCUMENTS

| | | | |
|---|---|---|---|
| 2010/0262964 A1 | 10/2010 | Uyeda et al. | |
| 2010/0269109 A1* | 10/2010 | Cartales ............... | G06F 9/5072 718/1 |
| 2011/0016473 A1* | 1/2011 | Srinivasan ........... | G06F 9/5077 718/105 |
| 2012/0311576 A1 | 12/2012 | Shu et al. | |
| 2013/0097319 A1* | 4/2013 | Ahmad ................. | G06F 9/5033 709/226 |
| 2013/0145368 A1 | 6/2013 | Ofer et al. | |
| 2013/0263120 A1 | 10/2013 | Patil et al. | |
| 2014/0019968 A1* | 1/2014 | Deng ................... | G06F 9/45558 718/1 |
| 2014/0020083 A1 | 1/2014 | Fetik | |
| 2014/0058871 A1* | 2/2014 | Marr ................... | G06F 9/45533 705/26.1 |
| 2014/0089916 A1* | 3/2014 | Gross .................. | G06F 11/0712 718/1 |
| 2014/0123146 A1* | 5/2014 | Barrow-Williams ....................... | G06F 9/5033 718/102 |
| 2014/0201425 A1 | 7/2014 | Clark et al. | |
| 2014/0215465 A1 | 7/2014 | Elzur | |
| 2014/0280547 A1* | 9/2014 | DeCusatis ............ | H04L 67/34 709/204 |
| 2014/0282520 A1* | 9/2014 | Sabharwal ........... | G06F 9/455 718/1 |
| 2014/0331227 A1* | 11/2014 | Ahmad ................. | G06F 9/5033 718/1 |
| 2014/0344807 A1* | 11/2014 | Bursell ............... | G06F 9/45558 718/1 |
| 2015/0019741 A1* | 1/2015 | DeCusatis ............ | H04L 67/34 709/226 |
| 2015/0248305 A1* | 9/2015 | Shu ..................... | G06F 9/45558 718/1 |
| 2015/0378759 A1* | 12/2015 | Pershin ............... | G06F 9/45558 718/1 |
| 2016/0043968 A1* | 2/2016 | Jacob .................. | H04L 47/808 709/226 |
| 2016/0055038 A1* | 2/2016 | Ghosh ................. | G06F 9/45558 718/105 |
| 2016/0205179 A1* | 7/2016 | Cui ..................... | G06F 9/5083 709/226 |
| 2016/0378518 A1* | 12/2016 | Antony ............... | G06F 9/45533 718/1 |

OTHER PUBLICATIONS

International Search Report & Written Opinion received in PCT Application No. PCT/US2015/013087, dated Jul. 29, 2015, 10 pages.

Cisco, "High-Availability Fault Tolerant Computing for Remote and Branch Offices HA/FT solutions for Cisco® UCS E-Series servers and VMware® vSphere®," (Research Paper), Mar. 5, 2014, 8 pages, available at http://www.cisco.com/c/dam/en/us/products/collateral/servers-unified-computing/ucs-e-series-servers/ucs_series_design_guide.pdf.

International Preliminary Report on Patentability received for PCT Patent Application No. PCT/US2015/013087, dated Aug. 10, 2017, 7 pages.

Alexander Ervik Johnsen, "Sanbolic Debuts Unified Scale-out Architecture Platform" SANBOLIC, May 13, 2014, available online at <http://www.ervik.as/sanbolic-debuts-unified-scale-out-architecture-platform/>, 4 pages.

* cited by examiner

VIRTUAL MACHINE PLACEMENT

BACKGROUND

In software defined storage environments, virtual machines supporting virtual storage clusters or application virtual machines may utilize common server and storage hardware. The virtual machines may be flexibly deployed, with respect to the server and storage hardware.

BRIEF DESCRIPTION OF THE DRAWINGS

Various examples will be described below with reference to the following figures.

DETAILED DESCRIPTION

Software defined storage (SDS) may utilize virtual storage appliance virtual machines in conjunction with server and storage hardware to support virtual storage clusters. Application virtual machines may be deployed on the same servers, and may use the storage clusters. The virtual machines may be flexibly deployed with respect to the server and storage hardware. Shutting down or reducing the power of servers may be deemed desirable, for example, to reduce operational costs and environmental impact. It may also be deemed desirable to operate SDS with high availability, fault tolerance, and quality of service requirements.

The techniques of the present application may define a placement plan (or plans) to place virtual storage appliance virtual machines and application virtual machines on servers. More particularly, some aspects of the techniques may relate to placing a virtual storage appliance virtual machine on a server that is connected to a storage asset used by that virtual storage appliance virtual machine. Accordingly, the techniques of the present application may be useful for intelligently manage and optimize virtual machine deployment to reduce server power usage while also providing for high availability, fault tolerance, and/or quality of service.

Figure 1:
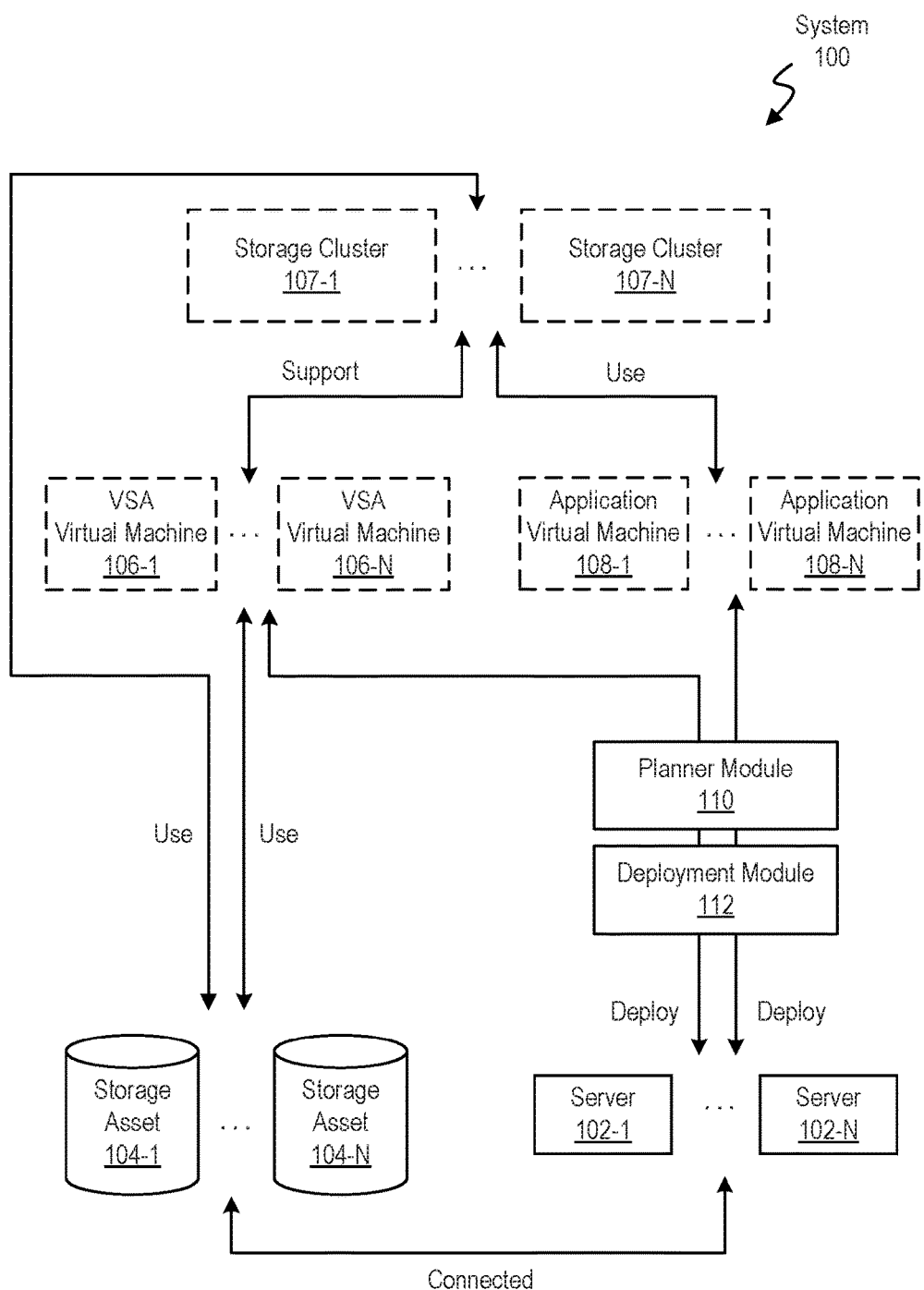
FIG. 1 is a block diagram of an example system according to an implementation.

Referring now to the figures, FIG. 1 is a block diagram of an example system 100. The system 100 comprises hardware components including a plurality of servers 102 (e.g., servers 102-1 through 102-N) and a plurality of storage assets 104 (e.g., storage assets 104-1 through 104-N). Virtual machines, including a plurality of virtual storage appliance (VSA) virtual machines 106 (also referred to herein as the VSA virtual machines; e.g., the VSA virtual machines 106-1 through 106-N) and at least one application virtual machine 108, can be deployed on the plurality of servers 102 (the VSA virtual machines 106 and the at least one application virtual machine 108 may be collectively referred to herein as the virtual machines). The system 100 may also include a planner module 110 and a deployment module 112. In some implementations, the planner module 110 and the deployment module 112 can be application virtual machines 108, processor(s) coupled to machine-readable medium encoded with instructions, and/or electronic circuitry, for performing the functionality described herein. In some implementations, the system 100 can form part of a software-defined storage environment.

In some implementations, the servers 102 can each include an operating system, a hypervisor, and/or the like, to manage deployment and implementation of virtual machines on that server. In some implementations, the servers 102 are connected to a network that can support communications between the servers 102. In some implementations, each server 102 may have a maximum utilization capacity, which can be a quantity representing the total resources available of the server 102 for use or consumption by virtual machines deployed on the server 102 (or alternatively, the total resources available to the server 102 for allocating to virtual machines). The maximum utilization capacity can be related to one or more resources of the server 102, and can be, for example, a processor utilization capacity, a memory utilization capacity, an electric power utilization capacity, and/or the like (including a composite representation of more than one resource). The maximum utilization capacity may vary among the servers 102, and can be defined for each server 102 by estimation (e.g., from the specifications of the server 102) or by measurement (e.g., by benchmarking).

In some implementations, individual ones of the storage assets 104 can be, for example, a storage array, a direct-attached storage, or other suitable storage hardware for use in an SDS environment. For example, a storage asset 104 may be a storage array having an array of disk drives that can connect to one or more of the servers 102 by way of a storage network (e.g., using Fibre Channel, Internet Small Computer System Interface (iSCSI), Ethernet, serial attached SCSI (SAS), and/or the like). In some implementations, a storage array connected to a server by way of a network may form part of a storage area network (SAN). In comparison to a storage array, a storage asset 104 that is a direct-attached storage can connect to a server 102 directly (e.g., by PCI, Serial ATA, SCSI, and/or the like) without a network in between the storage asset 104 and the server 102. The combination of a server 102 connected to a storage asset 104 of the direct-attached type may also be called a server with attached storage or a server with storage.

Each storage asset of the plurality of storage assets 104 can be connected to at least one of the servers 102. In some implementations, a storage asset 104 may be connected to more than one of the servers 102 (in other words, some of the servers 102 may be connected to the same one of the storage assets 104). In some implementations, a storage asset 104 may be connected to only one of the servers 102 (e.g., as with direct-attached storage, in some implementations). It should be understood that the configuration of connections between individual ones of the servers 102 and individual ones of the storage assets 104 may vary according to differing designs of the system 100.

As described above, the system 100 can include at least one application virtual machine 108. In some implementations, the system 100 can include a plurality of application virtual machines 108 (also referred to herein as the application virtual machines; e.g., the application virtual machines 108-1 through 108-N). An application virtual machine 108 can be a virtualized instance of an application deployed (or in other words, run, implemented, or executed) on a server of the plurality of servers 102. In some implementations, any of the servers 102 are capable of implementing an application virtual machine 108. An application virtual machine 108 may utilize some amount of the resources of the server 102 on which it is deployed, the utilized amount being deemed the server utilization of the application virtual machine 108. As with the maximum utilization capacity of the servers 102, the server utilization of an application virtual machine 108 can be in terms of, for example, processor utilization, memory utilization, electric power utilization, and/or the like (including a composite representation of more than one resource utilization).

The VSA virtual machines 106, in some implementations, can function as controllers deployed on the servers 102 to support (e.g., more particularly, create, maintain, and/or operate) one or more storage clusters 107 in the system 100. A storage cluster 107 can be a virtualized storage pool, using storage capacity consolidated from the physical hardware storage assets 104, that is available for use by one or more of the application virtual machines 108. Accordingly, an application virtual machine 108 can be deemed to be associated with a storage cluster 107 through use of the storage cluster 107.

In some implementations, each storage cluster 107 can be supported by at least one VSA virtual machine 106. In some implementations, a storage cluster 107 can be supported by a plurality of VSA virtual machines 106, so as to provide redundancy for high availability and/or fault tolerance. As with the application virtual machine 108, each of the VSA virtual machines 106 also utilizes some amount of the resources of the server 102 on which the VSA virtual machine 106 is deployed, the utilized amount being deemed the server utilization of the VSA virtual machine 106. As with the maximum utilization capacity of the servers 102, the server utilization of a VSA virtual machine 106 can be in terms of, for example, processor utilization, memory utilization, electric power utilization, and/or the like (including a composite representation of more than one resource utilization).

The planner module 110 can define a first placement plan and/or a second placement plan that place, respectively, the VSA virtual machines 106 and the application virtual machines 108, on the servers 102. As used herein, the term "place" or "places" may mean to plan or designate a placement. For example, the first placement plan can indicate on which of the servers 102 the VSA virtual machines 106 should be deployed by the deployment module 112. Similarly, the second placement plan can indicate on which of the servers 102 the application virtual machines 108 should be deployed. In some implementations, the planner module 110 defines the first placement plan prior to defining the second placement plan.

As used herein, and in some implementations, the first placement plan and the second placement plan may be part of or be defined together as one placement plan. In some implementations, the first placement plan and the second placement plan may be further divided into multiple placement plans. Moreover, in some implementations described herein, the first placement plan and the second placement plan may be referred to as one placement plan and another placement plan, or vice versa.

In some implementations, the planner module 110 can define the first placement plan by iteratively (or sequentially) placing individual VSA virtual machines 106 on the servers 102 until all VSA virtual machines 106 have been placed. Similarly, in some implementations, the planner module 110 can define the second placement plan by iteratively (or sequentially) placing individual application virtual machines 108 on the servers 102 until all application virtual machines 108 have been placed. For example, the planner module 110 can initially start with each server 102 having no virtual machines deployed thereon and each server 102 having an available utilization capacity that is equal to or substantially equal to its maximum utilization capacity. As the planner module 110 iteratively places a virtual machine on a server 102, the available utilization capacity of that server 102 is decreased by an amount corresponding to the server utilization of the virtual machine placed thereon. During a particular iteration, if the available utilization capacity of a server 102 (accounting for the server utilization of any virtual machines already placed thereon by previous iterations) is equal to or greater than the server utilization of a virtual machine being placed during the particular iteration, then the server 102 is deemed to have available utilization capacity for that virtual machine during the particular iteration. Otherwise, if the available utilization capacity of the server 102 is less than the server utilization of the virtual machine being placed, then the server 102 is deemed to not have available utilization capacity for that virtual machine during the particular iteration.

In some implementations, the planner module 110 defines the first placement plan and/or the second placement plan according to one or more rules. Example implementations of the planner module 110 to define the first placement plan and example implementations of the planner module 110 to define the second placement plan will now be described in turn.

The planner module 110 can define a first placement plan that places each VSA virtual machine of the plurality of VSA virtual machines 106 on a server of the plurality of servers 102. According to one rule, in some implementations, the planner module 110 can define the first placement plan to place each VSA virtual machine 106 on a server, of the plurality of servers 102, that is connected to a storage asset, of the plurality of storage assets 104, used by the respective VSA virtual machine (e.g., to support a storage cluster 107). By way of illustration, in one example, storage asset 104-1 may be connected to servers 102-1 and 102-2, and VSA virtual machine 106-1 may use the storage asset 104-1 to support a storage cluster 107-1. In the foregoing illustration, the planner module 110 would define the first placement plan to place VSA virtual machine 106-1 on server 102-1 or 102-2, because those servers are connected to storage asset 104-1, which is used by the VSA virtual machine 106-1 to support storage cluster 107-1. Accordingly, it can be understood that, by virtue of placing VSA virtual machines in the foregoing manner, VSA virtual machines 106 may be placed in close communication with a storage asset 104 forming at least part of a corresponding storage cluster 107, which may permit fast and efficient data transfer with the storage cluster 107.

According to another rule, in some implementations, the planner module 110 can define the first placement plan to place VSA virtual machines 106 supporting a same storage cluster on different servers 102. For example, continuing with the foregoing illustration, the storage cluster 107 can be supported by both the VSA virtual machine 106-1 and also a VSA virtual machine 106-2. Accordingly, in this example, the planner module 110 may define the first placement plan to place the VSA virtual machine 106-1 on the server 102-1 and to place the VSA virtual machine 106-2 on the server 102-2. By virtue of placing the VSA virtual machines on different servers, a failure of one server may be mitigated by continued operation of the other server(s), thus supporting redundancy, high availability, and/or fault tolerance characteristics of the corresponding storage cluster 107-1 (by contrast, placing all of the VSA virtual machines on the same server may result in a single point of failure for the corresponding storage cluster).

According to another rule, in some implementations, the planner module 110 can define the first placement plan by placing VSA virtual machines 106 in favor of servers with virtual machines over servers without virtual machines. For example, in some implementations, the planner module 110 may place virtual machines iteratively, as described above, and at an iteration, the planner module 110 may initially attempt to place a VSA virtual machine 106 on a server 102 on which a virtual machine (e.g., either a VSA virtual machine 106 or an application virtual machine 108) has been placed prior to the current iteration. If, on the other hand, the VSA virtual machine 106 cannot be placed on a server 102 that already includes a virtual machine (e.g., because no servers 102 have available utilization capacity for the VSA virtual machine 106 or because one or more of the other rules for defining the first placement plan would be violated), then the planner module 110 may place the VSA virtual machine 106 on a server 102 that does not have any virtual machine deployed thereon. By virtue of favoring servers with virtual machines over servers without virtual machines, the planner module 110 may possibly plan the consolidation of the VSA virtual machines 106 on to a minimal number of servers 102.

The planner module 110 can define a second placement plan that places each application virtual machine 108 (e.g., of a plurality of application virtual machines 108) on a server of the plurality of servers 102. According to one rule, in some implementations, the planner module 110 can define the second placement plan to place each application virtual machine of the plurality of application virtual machines 108 on a server, of the plurality of servers 102, that has available utilization capacity.

According to another rule, in some implementations, the planner module 110 can define the second placement plan to place each application virtual machine 108 in turn, by decreasing order of server utilizations of the plurality of application virtual machines 108. For example, if the planner module 110 places virtual machines iteratively as described above, the planner module 110 may, at an interval, identify an application virtual machine 108 having the highest server utilization among the application virtual machines 108 that have not yet been placed on a server 102, and place that application virtual machine 108 having the highest server utilization.

According to another rule, in some implementations, the planner module 110 can define the second placement plan to place each of the application virtual machines 108 on a server 102 associated with a storage cluster 107 used by a respective application virtual machine, if the server 102 associated with the storage cluster 110 has available utilization capacity for the respective application virtual machine. If the server 102 associated with the storage cluster 110 does not have available utilization capacity for the respective application virtual machine, the planner module 110 can place the respective application virtual machine on a server that has a highest available utilization capacity among the plurality of servers 102 and also has at least one other virtual machine (e.g., either a VSA virtual machine 106 or an application virtual machine 108). By way of illustration, in one example, an application virtual machine 108-1 may use storage cluster 107-1 that is supported by VSA virtual machines 106-1 and 106-2, and the VSA virtual machines 106-1 and 106-2 are placed (e.g., by the first placement plan) on servers 102-1 and 102-2, respectively. In this example, the planner module 110 would place the application virtual machine 108-1 on either server 102-1 or 102-2, depending on which of server 102-1 or 102-2 has available utilization capacity for the server utilization of the application virtual machine 108-1. If neither server 102-1 or 102-2 has available utilization capacity for the application virtual machine 108-1, the planner module 110 can place the application virtual machine 108-1 on one of the servers 102 that has a highest available utilization capacity and also has at least one other virtual machine placed thereon. By virtue of placing an application virtual machine on a server that is associated with a storage cluster used by the application virtual machine, communications between the application virtual machine and the storage cluster can be performed locally on the server without involving network communications, possibly resulting in improved (e.g., faster) performance of the application virtual machine.

According to another rule, in some implementations, the planner module 110 can define the second placement plan by placing application virtual machines 108 in favor of servers with virtual machines over servers without virtual machines. For example, in some implementations, the planner module 110 may place virtual machines iteratively, as described above, and at an iteration, the planner module 110 may initially attempt to place an application virtual machine 108 on a server 102 on which a virtual machine (e.g., either a VSA virtual machine 106 or an application virtual machine 108) has been placed prior to the current iteration. If, on the other hand, the application virtual machine 108 cannot be placed on a server 102 that already includes a virtual machine (e.g., because no servers 102 have available utilization capacity for the application virtual machine 108 or because one or more of the other rules for defining the second placement plan would be violated), then the planner module 110 may place the application virtual machine 106 on a server 102 that does not have any virtual machine deployed thereon. By virtue of favoring servers with virtual machines over servers without virtual machines, the planner module 110 may possibly plan the consolidate the application virtual machines 106 on to a minimal number of servers 102.

In some implementations, the planner module 110 can apply server utilization rules to the first placement plan and the second placement plan. For example, in some implementations, the server utilization rules may include a rule that a sum of the server utilizations of the VSA virtual machines 106 and the application virtual machines 108 placed on a server 102 (also referred to herein as the total server utilization) is less than or equal to the maximum utilization capacity of that server 102.

The deployment module 112 can be to deploy the VSA virtual machines 106 and the application virtual machines 108 on the servers 102 (or more particularly, on a subset of the servers 102), according to the first placement plan and the second placement plan respectively. In some implementations, the deployment module 112 can deploy the VSA virtual machines 106 and the application virtual machines 108 after the planner module 110 has completely defined the first placement plan and the second placement plan. In some implementations, the deployment module 112 can deploy the plurality of VSA virtual machines 106 and the plurality of application virtual machines 108 substantially concurrently as that the planner module 110 defines the first placement plan and the second placement plan. For example, in the implementations where the planner module 108 iteratively places the VSA virtual machines 106 and the application virtual machines 108, the deployment module 112 can deploy virtual machines after each iteration or a group of iterations performed by the planner module 110. In some implementations, deployment of the virtual machines by the deployment module 112 includes migration of at least one virtual machine.

By virtue of the planner module 110 and the deployment module 112, the virtual machines may be consolidated on a smaller number of servers 102 as compared to the deployment of the virtual machines on the servers 102 without the planner module 110 and the deployment module 112. In some implementations where virtual machines are migrated, the virtual machine utilization (i.e., utilization of the resources of a server attributed to virtual machines deployed thereon) of a subset of servers from which the virtual machines were migrated may be reduced.

Figure 2:
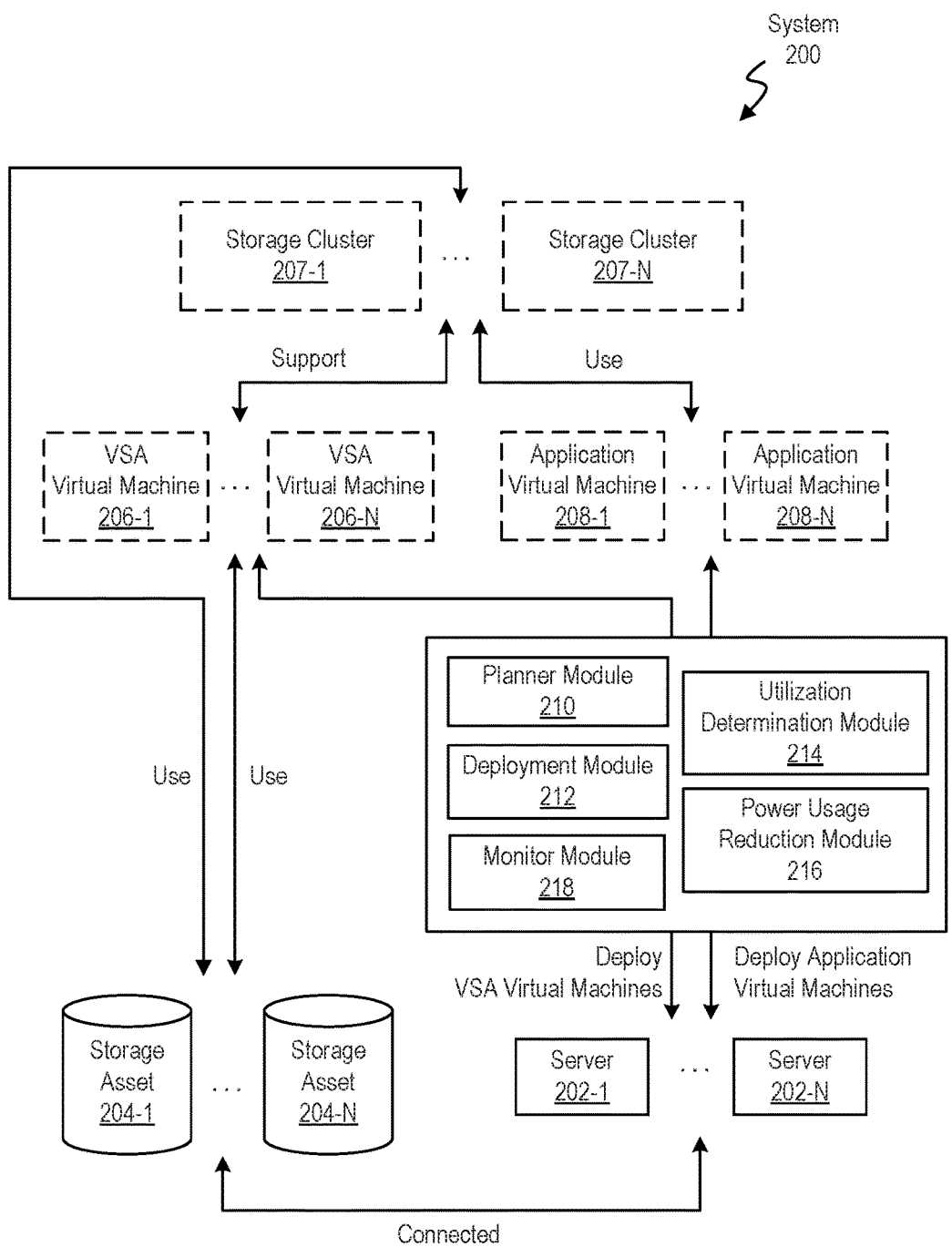
FIG. 2 is a block diagram of an example system according to another implementation.

FIG. 2 is a block diagram of an example system 200. The system 200 includes a plurality of servers 202 (e.g., servers 202-1 through 202-N) and a plurality of storage assets 204 (e.g., storage assets 204-1 through 204-N), which can be analogous in many respects to the plurality of servers 102 and the plurality of storage assets 104, respectively. The system 200 also includes VSA virtual machines 206 and at least one application virtual machine 208 (or a plurality of application virtual machines 208), which can be analogous in many respects to the VSA virtual machines 106 and the application virtual machine(s) 108, respectively. The system 100 may also include a planner module 210, a deployment module 212, a utilization determination module 214, a power usage reduction module 216, and/or a monitor module 218. The planner module 210 and the deployment module 212 can be analogous in many respects to the planner module 110 and the deployment module 112, respectively.

The utilization determination module 214 can, in some implementations, determine a server utilization of each VSA virtual machine 206 and can determine a server utilization of each application virtual machine 208. As described above with reference to FIG. 1, server utilization can be an amount of resources of a server 202 that is utilized or consumed by a virtual machine deployed thereon, such as a VSA virtual machine 206 or an application virtual machine 208. In some implementations, the utilization determination module 214 can determine the server utilization of each virtual machine on a server 202 by, for example, querying an operating system, a hypervisor, and/or the like, of the server 202 that is managing or running the respective virtual machine. The server utilization of each virtual machine can be a utilization of one or more resource type of the servers 202, such as a processor resource, a memory resource, an electric power resource, and/or the like. In some implementations, the utilization determination module 214 can calculate a peak usage, a time average, and/or other statistical/analytical representations of the server utilization. In some implementations, the utilization determination module 214 can determine the server utilization of a virtual machines at block 402 by estimation, based on, for example, server utilization of one or more similar virtual machines, historical server utilization data (more particularly, data of similar virtual machines), calculations and/or simulations, and/or the like.

The utilization determination module 214 also can, in some implementations, determine a maximum utilization capacity of each server of the plurality of servers 202. The maximum utilization capacity can be a quantity representing the total resources available of a server 102 for use or consumption by virtual machines deployed on the server 102 (or alternatively, the total resources available to the server 102 for allocating to virtual machines). In some implementations, the utilization determination module 214 can determine the maximum utilization capacity of a server 202 by receiving the specifications and configuration of the server 202 (e.g., the specifications of the server hardware components, including processor, memory, and the like) and analyzing the specifications and configuration and/or by benchmarking techniques. As with the server utilization of the virtual machines described above, the maximum utilization capacity of a server 202 can be related to one or more resources of the server 202, and can be, for example, a processor utilization capacity, a memory utilization capacity, an electric power utilization capacity, and/or the like. In some implementations, the server utilization and the maximum utilization capacity are related to the same type of resource(s) of the servers 202.

In some implementations, the utilization determination module 214 also can normalize the server utilizations of the VSA virtual machines 206, the server utilizations of the application virtual machines 208, and the maximum utilization capacities of the servers 202 by a lowest maximum utilization capacity of the servers 202. For example, some of the servers of the plurality of servers 202 may have different maximum utilization capacities, owing to different specifications and/or configurations, and a lowest one of the maximum utilization capacities of the servers 202 may correspond with the least powerful of the servers 202. By normalizing based on the lowest maximum utilization capacity, the server utilizations of the virtual machines and the maximum utilization capacities of the servers can be measured on a unitary normalized scale.

The planner module 210 can define a first placement plan and/or a second placement plan that place, respectively, the VSA virtual machines 206 and the application virtual machines 208, on the servers 202. The planner module 210 can be analogous to the planner module 110 in many respects. For example, the planner module 210 can define the first placement plan and the second placement plan according to one or more of the rules described above with respect to the planner module 110. In some implementations, the planner module 210 can use the server utilizations of the VSA virtual machines 206, the server utilizations of the application virtual machines 208, and/or the maximum utilization capacities of the servers determined by the utilization determination module 214 to define the first placement plan or the second placement plan.

As with the planner module 110, the planner module 210 can apply server utilization rules to the first placement plan and the second placement plan. In some implementations, the server utilization rules applied by the planner module 210 are based on the maximum utilization capacity of each of the servers, as determined by utilization determination module 214 (or a normalized maximum utilization capacity). For example, the planner module 210 can apply a server utilization rule that requires the sum of the server utilizations of the VSA virtual machines 206 and/or the application virtual machines 208 placed on a server 202 (as known as the total server utilization) to be less than or equal to the maximum utilization capacity of that server 202.

Additionally or alternatively, server utilization rules can be based on a maximum storage cluster utilization of each of the servers 202. In some implementations, the maximum storage cluster utilization of a server 202 can be a limit on how much of the maximum utilization capacity of the server 202 can be used by storage clusters 210 (in other words, the maximum storage cluster utilization can be a limitation on the sum of the server utilizations of all VSA virtual machines 206 placed on a server 202). In some implementations, the maximum storage cluster utilization can be a limit on the server utilization of each individual VSA virtual machine 206 placed on the server 202. For example, the planner module 110 can apply a server utilization rule based on the maximum storage cluster utilization such that, for each server 202, the server utilizations of individual VSA virtual machines 206 placed on the server 202 (as determined by utilization determination module 214) and/or the sum of server utilizations of all VSA virtual machines 206 placed on the server 202, is less than or equal to the maximum storage cluster utilization. By virtue of applying a server utilization rule, the planner module 210 may attempt to prevent or reduce over-utilization of the servers 202 and may attempt to balance utilization of the servers 202.

As with the deployment module 112, the deployment module 212 can deploy the VSA virtual machines 106 and the application virtual machines 108, according to the first placement plan and the second placement plan, respectively. After deploying the virtual machines, a subset of servers 202 may have no virtual machines deployed thereon, or may have a low total server utilization.

The power usage reduction module 216 can reduce the power usage of the subset of servers 202 that has no virtual machines and/or has a low total server utilization. The power usage reduction module 216 may reduce the power usage of individual servers of the subset of servers in the same manner or in different manners. For example, in some implementations, the power usage reduction module 216 may shut down a server 202 to reduce its power usage. In some implementations, the power usage reduction module 216 may reduce the power usage a server 202 by employing one or more power management techniques, such as shutting down one or more processor cores, reducing a processor frequency, reducing a processor voltage, reducing a memory bus speed, disabling memory interleaving, and/or the like.

The monitor module 218 can monitor for changes of the plurality of VSA virtual machines 206, the plurality of application virtual machines 208, and/or the plurality of servers 202. For example, the monitor module 218 can monitor for changes by querying the servers 202 or operating systems/hypervisors on the servers 202 (or requesting notification of changes from the same). Changes of interest to the monitor module 218 may include, for example, a hardware configuration change of a server 202 that may change a corresponding maximum utilization capacity of the changed server 202, an addition of a new VSA virtual machine to the plurality of VSA virtual machines 206, an addition of a new application virtual machine to the plurality of application virtual machines 208, a termination of a VSA virtual machine of the plurality of VSA virtual machines 206, or a termination of an application virtual machine of the plurality of application virtual machines 208. In some implementations, the monitor module 218 also can monitor for changes to the server utilizations of any of the plurality of the VSA virtual machines 206 or any of the plurality of the application virtual machines 208, such as a change in the server utilizations that exceeds or differs from the server utilizations used by the planner module 210 to define the first placement plan and the second placement plan. In some implementations, the monitor module 218 can monitor for changes to the server utilizations by using the utilization determination module 214.

In response to a change in the plurality of VSA virtual machines 206, the plurality of application virtual machines 208, and/or the plurality of servers 202, the monitor module 218 can redefine the first placement plan and/or the second placement plan based on the change. For example, in some implementations, the monitor module 218 can instruct the utilization determination module 214 to determine the server utilizations of each VSA virtual machine 206, the server utilizations of each application virtual machine 208, and/or the maximum utilization capacity of each server 202, and instruct the planner module 210 to define a new or revised first placement plan and/or a new or revised second placement plan based on the determinations made by the utilization determination module 214.

Figure 3:
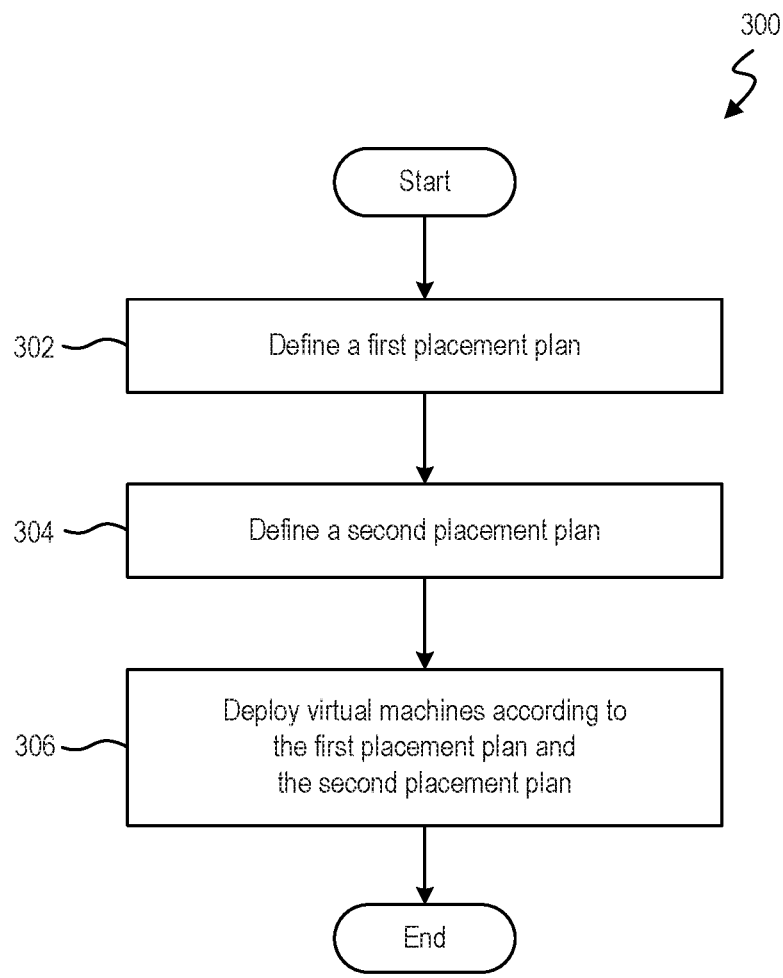
FIG. 3 is a flow diagram of an example method for deploying virtual machines according to an implementation.

FIG. 3 is a flow diagram of a method 300 for deploying virtual machines according to an example implementation. In some implementations, the method 300 may be implemented, at least in part, in the form of executable instructions stored on a machine-readable medium and/or in the form of electronic circuitry. In some implementations, the steps of method 300 may be executed substantially concurrently or in a different order than shown in FIG. 3. In some implementations, method 300 may include more or less steps than are shown in FIG. 3. In some implementations, one or more of the steps of method 300 may, at certain times, be ongoing and/or may repeat. Although execution of the method 300 is described below with reference to system 100, it should be understood that at least portions of method 300 can be performed by any other suitable device or system, such as, for example, the system 200 of FIG. 2.

The method 300 starts, and at block 302, the planner module 110 defines a first placement plan by placing each VSA virtual machine of a plurality of VSA virtual machines 106 on a server, of a plurality of servers, that is connected to a storage asset 104 used by a respective VSA virtual machine to support a storage cluster 107. By way of illustration, as described in an example above with reference to FIG. 1, storage asset 104-1 may be connected to servers 102-1 and 102-2, and VSA virtual machine 106-1 may use the storage asset 104-1 to support a storage cluster 107-1. In the foregoing illustration, the planner module 110 would define the first placement plan at block 302 to place VSA virtual machine 106-1 on server 102-1 or 102-2, because those servers are connected to storage asset 104-1 that is used by the VSA virtual machine 106-1 to support storage cluster 107-1.

In some implementations, the planner module 110 defines the first placement plan at block 302 by placing each VSA virtual machine iteratively. In some implementations, the planner module 110 places a VSA virtual machine 106 that uses a storage asset 104 connected to a single server on that single server prior to placing a VSA virtual machine 106 that uses a storage asset 104 connected to multiple servers, since a VSA virtual machine 106 that uses a storage asset connected to multiple servers may be deemed to have more options of server placement than a VSA virtual machine 106 that uses a storage asset 104 connected to a single server. In some implementations, VSA virtual machines 106 supporting a same storage cluster are each placed on different servers of the plurality of servers 102. In some implementations, the plurality of VSA virtual machines 106 are placed on servers with virtual machines before servers without virtual machines.

At block 304, the planner module 110 defines a second placement plan by placing an application virtual machine 108 on a server, of the plurality of servers 102, having available utilization capacity for the application virtual machine 108, and by placing the application virtual machine 108 on servers 102 with virtual machines before servers 102 without virtual machines. In some implementations, a server 102 is deemed to have available utilization capacity if the maximum utilization capacity of the server 102 less the sum of the server utilizations of any virtual machines placed on the server 102 (e.g., VSA virtual machines 106 placed on the server 102 at block 302) is greater than or equal to the server utilization of the application virtual machine 108. In some implementations, defining the first placement plan at block 302 is performed prior to defining the second placement plan at block 304.

In some implementations, the application virtual machine 108 is one of a plurality of application virtual machines 108 (e.g., application virtual machines 108-1 through 108-N), and the planner module 110 defines the second placement plan at block 304 also by placing each application virtual machine of the plurality of application virtual machines 108 in turn by decreasing order of server utilizations of the plurality of application virtual machines 108.

In some implementations, the planner module 110 defines the second placement plan at block 304 also by placing each application virtual machine of a plurality of application virtual machines 108 on a server associated with a storage cluster used by a respective application virtual machine if the server associated with the storage cluster used by the respective application virtual machine has available utilization capacity for the respective application virtual machine, or else by placing the respective application virtual machine on a server having a highest utilization capacity among the plurality of servers and having at least one other virtual machine. By way of illustration, as described in an example above with reference to FIG. 1, an application virtual machine 108-1 may use storage cluster 110-1 that is supported by VSA virtual machines 106-1 and 106-2, and the VSA virtual machines 106-1 and 106-2 are placed (e.g., at block 302) on servers 102-1 and 102-2, respectively. In the foregoing illustration, the planner module 110 would place, at block 304, the application virtual machine 108-1 on either server 102-1 or 102-2, depending on which of server 102-1 or 102-2 has available utilization capacity for the server utilization of the application virtual machine 108-1. If neither server 102-1 or 102-2 has available utilization capacity for the application virtual machine 108-1, the planner module 110 can place the application virtual machine 108-1 on a server 102 that has a highest available utilization capacity and also has at least one other virtual machine placed thereon.

At block 306, the deployment module 112 deploys the plurality of VSA virtual machines 106 and the application virtual machine 108 according to the first placement plan (as defined at block 302) and the second placement plan (as defined at block 304), respectively. By virtue of block 306, deployment of the VSA virtual machines 106 and the application virtual machine 108 may possibly be consolidated on to a minimal number of servers 102. After block 306, the method 300 can end.

Figure 4:
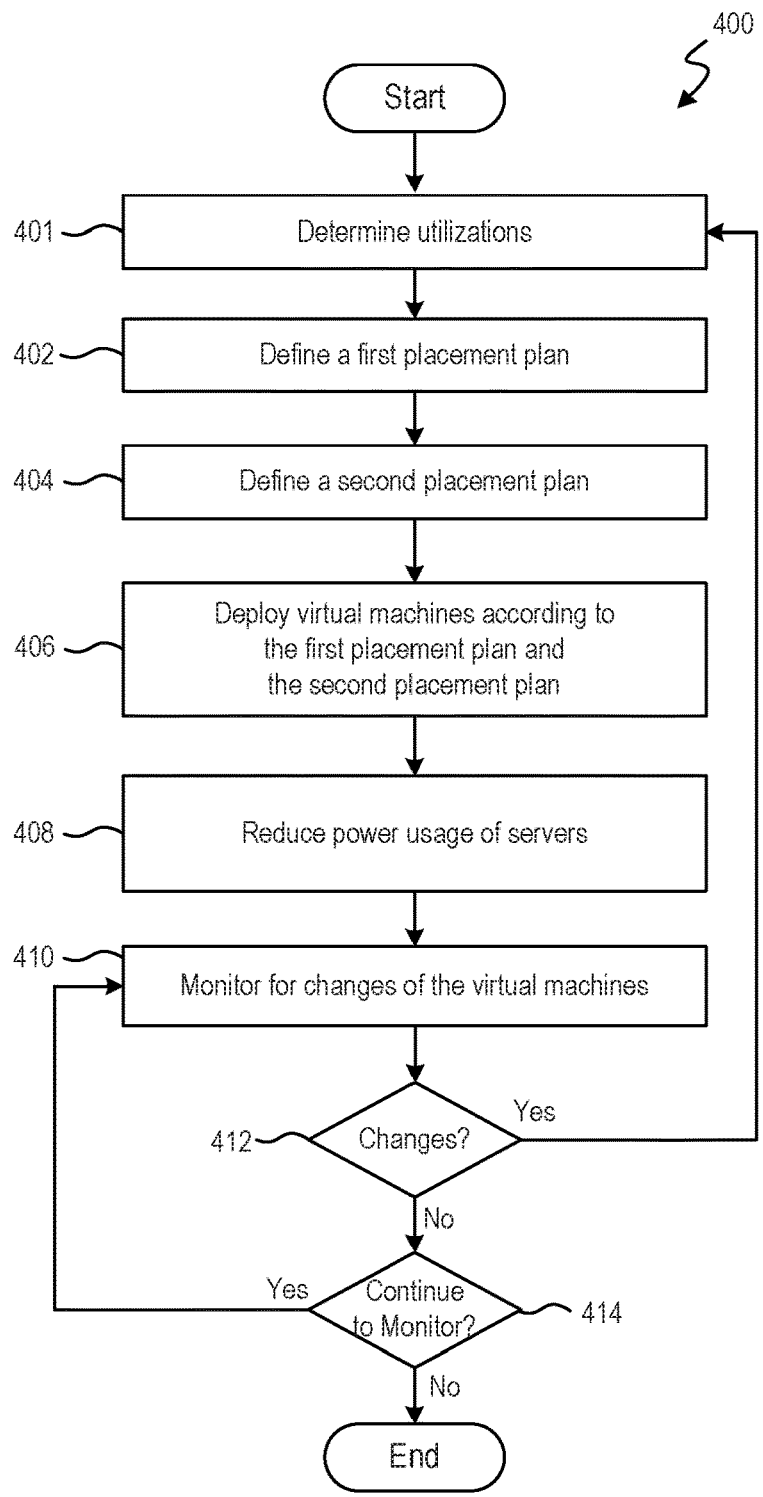
FIG. 4 is a flow diagram of an example method for deploying virtual machines according to another implementation.

FIG. 4 is a flow diagram of a method 400 for deploying virtual machines according to an example implementation. In some implementations, the method 400 may be implemented, at least in part, in the form of executable instructions stored on a machine-readable medium and/or in the form of electronic circuitry. In some implementations, the steps of method 400 may be executed substantially concurrently or in a different order than shown in FIG. 4. In some implementations, method 400 may include more or less steps than are shown in FIG. 4. In some implementations, one or more of the steps of method 400 may, at certain times, be ongoing and/or may repeat. Although execution of the method 400 is described below with reference to system 200, it should be understood that at least portions of method 400 can be performed by any other suitable device or system, such as, for example, the system 100 of FIG. 1.

In some implementations, prior to the start of method 400, the VSA virtual machines 206 and the application virtual machines 208 have been previously deployed on the servers 202. In some implementations, one or more of the VSA virtual machines 206 and/or one or more of the application virtual machines 208 have not been deployed on the servers 202.

The method 400 starts, and at block 401, the utilization determination module 214 determines at least one of: a server utilization of each VSA virtual machine 206, a server utilization of an application virtual machine 208 (or, in some implementations, the server utilization of each application virtual machine of a plurality of application virtual machines 208), and/or a maximum utilization capacity of each server of the plurality of servers 202.

As described above, a server utilization can be an amount of resources of a server 202 that is utilized or consumed by a virtual machine deployed thereon, such as a VSA virtual machine 206 or an application virtual machine 208. In some implementations, the utilization determination module 214 can determine the server utilization of a virtual machine (e.g., VSA virtual machine(s) and/or application virtual machine(s)) at block 401 by, for example, querying an operating system, a hypervisor, and/or the like, of the server 202 that is managing or running the virtual machine. In some implementations, where one or more of the VSA virtual machines 206 and/or the application virtual machines 208 have not been deployed, the utilization determination module 214 can determine the server utilization of a not-deployed virtual machine at block 401 by estimation based on, for example, server utilization of one or more deployed virtual machine (e.g., a deployed virtual machine that is similar to the not-deployed virtual machine), historical server utilization data (e.g., of virtual machines similar to the not-deployed virtual machine), calculations and/or simulations, and/or the like. In some implementations, the utilization determination module 214 can be a peak usage, a time average, and/or other statistical/analytical representations of the server utilization.

In some implementations, the utilization determination module 214 can determine the maximum utilization capacity of a server 202 by receiving and analyzing the specifications and configuration of the server 202 and/or by benchmarking the servers 202. In some implementations, the utilization determination module 214 also can normalize the server utilizations of the VSA virtual machines 206, the server utilizations of the application virtual machine(s) 208, and/or the maximum utilization capacities of the servers 202 by a lowest maximum utilization capacity of the servers 202.

At block 402, the planner module 210 can define a first placement plan that places each of the VSA virtual machines 206 on the servers 202, in a manner analogous in many respects to block 302. In addition to defining the first placement plan in the manner of block 302, the planner module 210 also can apply a rule to defining the first placement plan that limits a total server utilization of each server 202 to less than or equal to the maximum utilization capacity of the respective server. For example, a server 202-1 may have a maximum utilization capacity, which can be determined at block 401, and the sum of the server utilizations of the VSA virtual machines 206 placed on a server 202-1 at block 402 (i.e., the total server utilization of the server 202-1, as of block 402) is limited by the rule to less than or equal to the maximum utilization capacity of the server 202-1.

In some implementations, while performing block 402, the planner module 210 also can adjust a number of VSA virtual machines 206 supporting the same storage cluster (e.g., 207-1) between a minimum and a maximum, in view of a maximum storage cluster utilization of each server of the plurality of servers 202. In some implementations, the maximum storage cluster utilization can be a limit on how much of the maximum utilization capacity of a server 202 can be used by storage clusters 210 (i.e., the sum of the server utilizations of all VSA virtual machines 206 placed on a server 202). Additionally or alternatively, in some implementations, the maximum storage cluster utilization can be a limit on the server utilization of each individual VSA virtual machine 206 placed on the server 202. In some implementations, the minimum can be related to a minimum number of VSA virtual machines 206 desired for providing fault tolerance for a storage cluster 207-1. In some implementations, the maximum number of VSA virtual machines 206 supporting the same storage cluster 207-1 can be related to characteristics such as quality of service, threading, performance, and/or the like. From the minimum to the maximum, the server utilization of each VSA virtual machine 206 supporting the same storage cluster 207-1 can vary inversely with the number of VSA virtual machines 206 supporting the same storage cluster 207-1 (owing to a server utilization of a storage cluster 207-1 being divided evenly among VSA virtual machines 206 supporting the same storage cluster 207-1). Accordingly, by increasing or decreasing the number of VSA virtual machines 206 supporting the same storage cluster 207-1 (between the minimum and the maximum), the server utilization of each of those VSA virtual machines 206 can be decreased or increased, respectively, allowing the planner module 210 to change the server utilization so as to satisfy the maximum storage cluster utilization and/or the maximum utilization capacity of a server 202.

By way of illustration, the storage cluster 207-1 may be supported by VSA virtual machines 206-1 and 206-2, the storage cluster 207-1 may allow for a minimum of two virtual machines and a maximum of three virtual machines, the planner module 210 has determined that VSA virtual machine 206-1 should be placed on server 202-1 due to at least one of the other rules discussed herein, the server 202-1 has 0.2 units of available utilization capacity, and the VSA virtual machines 206-1 and 206-2 each have a server utilization of 0.3 units (a total of 0.6 units for the storage cluster 207-1) determined at block 401. Because the VSA virtual machine 206-1 will not fit on the server 202-1, owing to the server utilization of 0.3 being greater than the 0.2 units of available utilization capacity, the planning module 210 can adjust the number of VSA virtual machines supporting the storage cluster 207-1 by adding a VSA virtual machine 206-3, bringing the number of VSA virtual machines for the storage cluster 207-1 to the maximum of three. Accordingly, the server utilization of each VSA virtual machine supporting the storage cluster 207-1 decreases to 0.2 units (i.e., the storage cluster 207-1 total of 0.6 units divided among three VSA virtual machines), and the planner module 210 can place VSA virtual machine 206-1 on the server 202-1.

At block 404, the planner module 210 can define a second placement plan that places an application virtual machine 208 (or, in some implementations, each application virtual machine of a plurality of application virtual machines 206) on the servers 202, in a manner analogous in many respects to block 304. In addition to defining the second placement plan in the manner of block 304, the planner module 210 also can apply a rule to defining the second placement plan that limits a total server utilization of each server 202 to less than or equal to the maximum utilization capacity of the respective server. For example, in some implementations where block 404 is performed after block 402, the total server utilization of a server 202-1 is the sum of the server utilizations of the VSA virtual machines 206 placed on a server 202-1 at block 402 and the server utilization of application virtual machine(s) 208 placed on the server 202-1 at block 404, and the total server utilization is limited by the rule at block 404 to less than or equal to the maximum utilization capacity of the server 202-1, which may be determined at block 401.

At block 406, the deployment module 212 can deploy the plurality of VSA virtual machines 206 and the application virtual machine 208 (or a plurality of application virtual machines 208) on the servers 202 according to the first placement plan and the second placement plan, respectively. Block 406 can be analogous to block 306 in many respects. In some implementations, the deploying can include migrating at least some of the plurality of VSA virtual machines 206 and/or the application virtual machine 208 (e.g., virtual machines that were deployed on the servers 202 prior to the start of method 400) from a first subset of the plurality of servers 202 to a second subset of plurality of servers 202.

At block 408, the power usage reduction module 216 can reduce a power usage at least one of the plurality of servers 202. In some implementations, the power usage reduction module 216 may shut down a server 202 of the first subset of servers 202 to reduce its power usage. In some implementations, the power usage reduction module 216 may reduce the power usage a server 202 of the first subset by employing one or more power management technique, such as shutting down one or more processor cores, reducing a processor frequency, reducing a processor voltage, reducing a memory bus speed, disabling memory interleaving, and/or the like.

At block 410, the monitor module 218 can monitor for changes of the plurality of VSA virtual machines 206 and/or the application virtual machine(s) 208. For example, the monitor module 218 can monitor for changes by querying the servers or operating systems/hypervisors on the servers 202 (or requesting notification of changes from the same). Changes of interest to the monitor module 218 may include, for example, a hardware configuration change to a server 202 that may change a corresponding maximum utilization capacity of the changed server 202, an addition of a new VSA virtual machine to the plurality of VSA virtual machines 206, an addition of a new application virtual machine to the plurality of application virtual machines 208, a termination of a VSA virtual machine of the plurality of VSA virtual machines 206, or a termination of an application virtual machine of the plurality of application virtual machines 208. In some implementations, the monitor module 218 also can monitor for changes to the server utilizations of any of the VSA virtual machines 206 or any of the application virtual machines 208 (e.g., by using the utilization determination module 214 in the manner described above with respect to block 401), with changes of interest including, for example, a change in the server utilizations that exceeds or differs from the server utilizations used by the planner module 210 to define the first placement plan at block 402 and the second placement plan at block 404.

At block 412, if changes have been made ("YES" at block 412), as determined by the monitor module 218 at block 408, then the system 200 redefines the first placement plan and/or the second placement plan, based on the changes, and deploys the plurality of VSA virtual machines 206 and the application virtual machine(s) 208 according to the redefined first placement plan and/or the redefined second placement plan. For example, in some implementations, if changes have been made ("YES" at block 412), control can pass back to block 401, and the method 400 is performed again.

At block 412, if no changes have been made ("NO" at block 412), as determined by the monitor module 218 at block 410, then control passes to block 414. At block 414, if continued monitoring is desired (e.g., by default), then control returns to block 410, and the monitor module 218 can continue to monitor for changes as described above. If, at block 414, continued monitoring is not desired (e.g., by user command, an interrupt request, or the like), then the method 400 can end.

Figure 5:
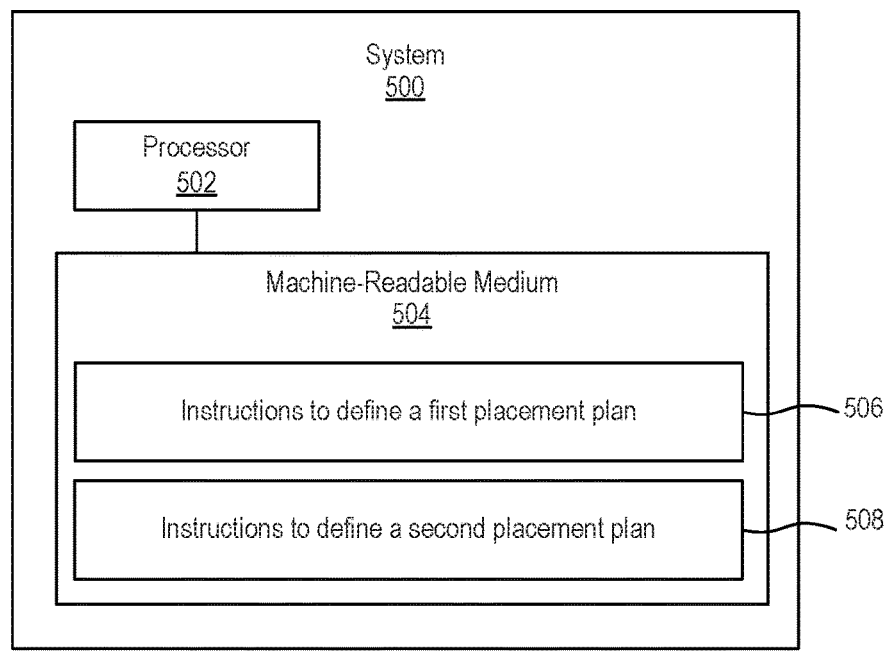
FIG. 5 is a block diagram of an example computing device that includes a machine-readable medium encoded with instructions for deploying virtual machines according to an implementation.

FIG. 5 is a block diagram illustrating a system 500 that includes a machine-readable medium encoded with instructions to migrate virtual machines according to an example implementation. In some example implementations, the system 500 can form part of a laptop computer, a desktop computer, a workstation, a server, a mobile phone, a tablet computing device, and/or other electronic device. In some implementations, the system 500 can be communicatively coupled to a plurality of servers (e.g., the plurality of servers 100 or the plurality of servers 200). In some implementations, the system 500 can be communicatively coupled to a plurality of storage assets (e.g., the plurality of storage assets 100 or the plurality of storage assets 200).

In some implementations, the system 500 is a processor-based system and can include a processor 502 coupled to a machine-readable medium 504. The processor 502 can include a central processing unit, a multiple processing unit, a microprocessor, an application-specific integrated circuit, a field programmable gate array, and/or other hardware device suitable for retrieval and/or execution of instructions from the machine-readable medium 504 (e.g., instructions 506 and 508) to perform the various functions discussed herein. Additionally or alternatively, the processor 502 can include electronic circuitry for performing the functionality described herein, including the functionality of instructions 506 and 508.

The machine-readable medium 504 can be any medium suitable for storing executable instructions, such as random access memory (RAM), electrically erasable programmable read-only memory (EEPROM), flash memory, hard disk drives, optical discs, and the like. In some example implementations, the machine-readable medium 504 can be a tangible, non-transitory medium, where the term "non-transitory" does not encompass transitory propagating signals. As described further herein below, the machine-readable medium 504 can be encoded with a set of executable instructions 506 and 508.

Instructions 506 can define a first placement plan that places each VSA virtual machine of a plurality of VSA virtual machines on a server, of a plurality of servers, that is connected to a storage asset used by a respective VSA virtual machine, that places each VSA virtual machines associated with a same storage cluster on different servers, and that places VSA virtual machines in favor of servers with at least one virtual machine over servers without virtual machines.

Instructions 508 can define a second placement plan that places each of a plurality of application virtual machines on a server, of the plurality of servers, associated with a storage cluster used by a respective application virtual machine if the server associated with the storage cluster used by the respective application virtual machine has available utilization capacity for the respective application virtual machine, or else places each of the plurality of application virtual machines in turn by decreasing order of server utilizations of application virtual machines on a server having available utilization capacity. In some implementations, instructions 508 also can place of application virtual machines in favor of servers with at least one virtual machine over servers without virtual machines.

In some implementations, instructions 506 and 508 can also apply server utilization rules to the first placement plan and the second placement plan. For example, in some implementations, the server utilization rules may include a rule that a sum of the server utilizations of the VSA virtual machines and the application virtual machines placed on a server is less than or equal to the maximum utilization capacity of that server.

Figure 6:
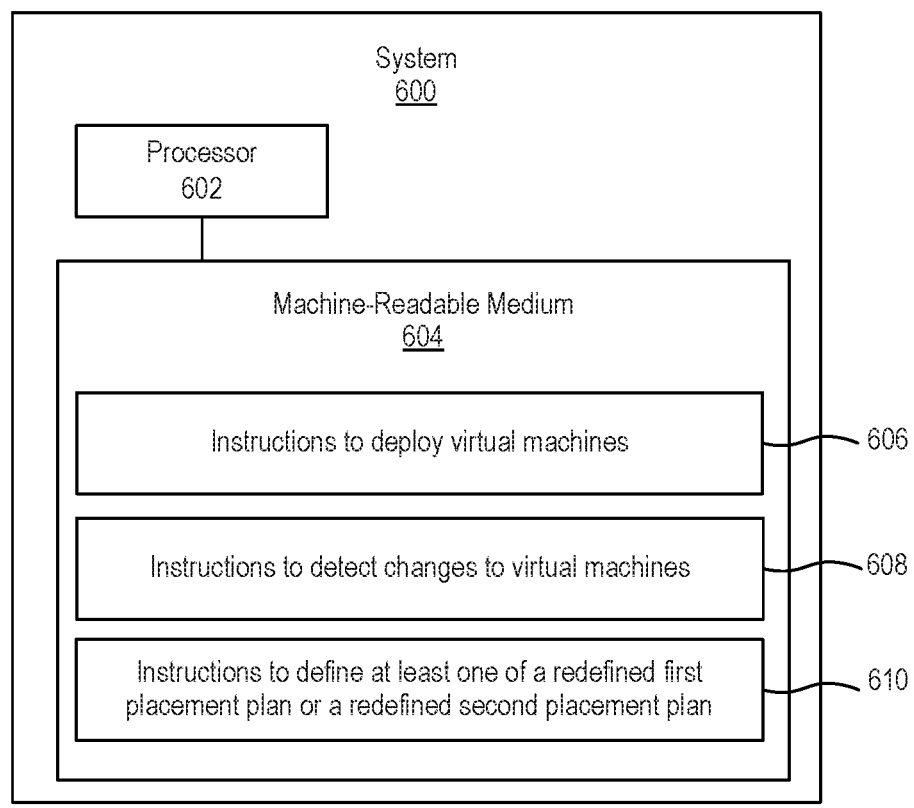
FIG. 6 is a block diagram of an example computing device that includes a machine-readable medium encoded with instructions for deploying virtual machines according to another implementation.

FIG. 6 is a block diagram illustrating a system 600 that includes a machine-readable medium encoded with instructions to migrate virtual machines according to an example implementation. In some example implementations, the system 600 can form part of a laptop computer, a desktop computer, a workstation, a server, a mobile phone, a tablet computing device, and/or other electronic device. In some implementations, the system 600 can be communicatively coupled to a plurality of servers (e.g., the plurality of servers 100 or the plurality of servers 200). In some implementations, the system 600 can be communicatively coupled to a plurality of storage assets (e.g., the plurality of storage assets 100 or the plurality of storage assets 200).

In some implementations, the system 600 is a processor-based system and can include a processor 602 coupled to a machine-readable medium 604. The processor 602 and the machine-readable medium 604 can be analogous in many respects to the processor 502 and the machine-readable medium 504, respectively. The machine-readable medium 604 can be encoded with a set of executable instructions 606, 608, and 610. Additionally or alternatively, the processor 602 can include electronic circuitry for performing the functionality described herein, including the functionality of instructions 606, 608, and/or 610.

Instructions 606 can deploy the plurality of VSA virtual machines and the plurality of application virtual machines. In particular, the instructions 606 can deploy the VSA virtual machines and the application virtual machines on to a first subset of the plurality of servers according to the first placement plan and the second placement plan, respectively. In some implementations, instructions 606 also can reduce the power usage of a second subset of the plurality of servers. For example, the second subset of the plurality of servers may have no virtual machines deployed thereon by virtue of deploying the plurality of VSA virtual machines and the application virtual machines according to the first placement plan and the second placement plan.

Instructions 608 can detect changes to the plurality of VSA virtual machines and/or the plurality of application virtual machines. For example, instructions 608 can query operating systems, hypervisors, and/or the like, of servers that are managing or running the plurality of VSA virtual machines and/or the plurality of application virtual machines, and analyze whether characteristics of those virtual machines, such as the server utilization of the virtual machines, have changed.

Instructions 610 can define at least one of a redefined first placement plan or a redefined second placement plan in response to the changes. In some implementations, instructions 610 can define a redefined first placement plan or a redefined second placement plan by performing the functionality described above with respect to instructions 506 and instructions 508, respectively.

Figure 7:
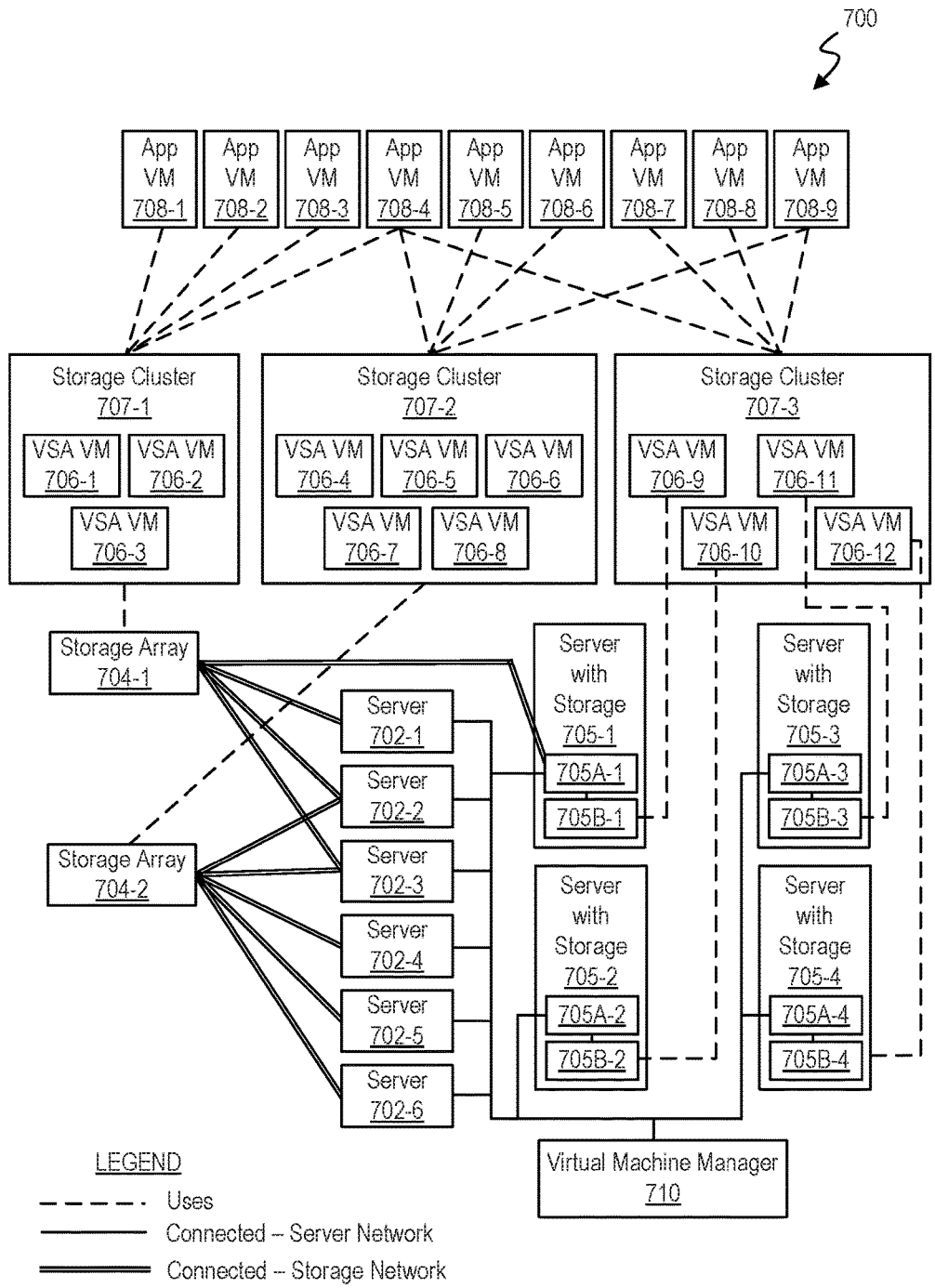
FIG. 7 is an example illustration according to an implementation.

The methods described herein will now be illustrated with reference to FIG. 7. FIG. 7 illustrates an example system 700 that includes hardware server and storage components. For example, system 700 includes servers 702 (702-1 through 702-6), storage arrays 704 (704-1 and 704-2), and servers with storage 705 (705-1 through 705-4). The servers with storage 705 each comprise a server 705A (705A-1 through 705A-4) connected directly to a respective direct-attached storage 705B (705B-1 through 705B-4) without a network, by way of, for example, PCI, serial ATA, SCSI, and/or the like. The storage arrays 704 and the direct-attached storage 705B can be referred to collectively as storage assets 704 and 705B of the system 700. The servers 702 and the servers 705A can be referred to collectively as the servers 702 and 705A of the system 700. The servers 702 and 705A are communicatively connected (as represented by solid lines in FIG. 7) among themselves by way of a network (e.g., a local area network). The storage arrays 704 can be, for example, an array of disk drives that can connect (as represented by double lines in FIG. 7) to the servers 702 and 705A by way of a network and more particularly, a storage network using, for example, Fibre Channel, iSCSI, Ethernet, SAS, and/or the like.

The system 700 also includes virtual machines running on the servers 705. The virtual machines may include VSA virtual machines (VSA VMs) 706 (706-1 through 706-12) and application virtual machines (App VMs) 708 (708-1 through 708-9). In particular, the VSA virtual machines 706 support (i.e., create, maintain, and/or operate) storage clusters 707 (707-1 through 707-3), by consolidating storage capacity from the storage assets 704 and 705B into virtualized storage pools forming storage clusters 707. As shown in FIG. 7, each of the storage clusters 707 can be supported by more than one VSA virtual machine 706, for the example purposes of high availability and fault tolerance. Each storage cluster 707 may have a rule requiring a number of supporting VSA virtual machines 706 to be between a minimum and a maximum. That the storage cluster 707 uses storage capacity of a storage asset is illustrated in FIG. 7 as dashed lines between the storage clusters 707 and the storage assets 704 and 705B. Some of the application virtual machines 708 use some of the storage clusters 707 (illustrated as dashed lines between the application virtual machines 708 and the storage clusters 707), for the example purposes of data storage and the like. For example, application virtual machines 708-1, 708-2, 708-3, and 708-4 use storage cluster 707-1, application virtual machines 708-4, 708-5, 708-6, and 708-9 use storage cluster 707-2, and application virtual machines 708-4, 708-7, 708-8, and 708-9 use storage cluster 707-3. By virtue of the application virtual machines 708 using the storage clusters and the storage clusters 707 using the storage assets 704 and 705B, some storage assets 704 and 705B may be deemed associated with some application virtual machines 708 and vice versa. For example, storage array 704-1 is associated with application virtual machines 708-1, 708-2, 708-3, and 708-4 by virtue of commonality in storage cluster 707.

The system 700 can also include a virtual machine manager 710, which can implement the functionality described herein with respect to methods 300 and 400. In some implementations, the virtual machine manager 710 can include the planner module 210, the deployment module 212, the utilization determination module 214, the power usage reduction module 216, and/or the monitor module 218 of system 200. In some implementations, the virtual machine manager 710 can be included in the system 500 and/or the system 600. In some implementations, the virtual machine manager 710 may have access to a map of the system 700, including at least the connections among the servers 702 and 705A and the storage assets 704 and 705B.

Initially, the virtual machine manager 710 determines a server utilization of each VSA virtual machine 706 and each application virtual machine 708. The virtual machine manager 710 can also determine the maximum utilization capacity of each server 702 and 705A. For example, the virtual machine manager 710 can perform block 401. The virtual machine manager 710 can calculate a server utilization for each storage cluster 707 by adding the server utilizations of the VSA virtual machines supporting a storage cluster 707 (e.g., the calculated server utilization related to storage cluster 707-1 is the sum of the server utilizations of supporting VSA virtual machines 706-1, 706-2, and 706-3). The server utilizations of the VSA virtual machines 706, the server utilizations of the application virtual machines 708, and the maximum utilization capacities of the servers 702 and 705A can be normalized by the lowest maximum utilization capacity of the servers 702. Table 1 presents example determined server utilizations and maximum utilization capacities for system 700, as well as relationships between application virtual machines 708, storage clusters 707, VSA virtual machines 706, storage assets 704 and 705B, and servers 702 and 705A. Table 1 also presents configuration rules for the minimum and maximum number of VSA virtual machines 706 permitted by each storage cluster 707, and a rule for the maximum storage cluster utilization permitted by each server 702 and 705A.

TABLE 1

Virtual Machines and Storage Clusters

| Element | Configuration Uses: | Supports: | Rules | Determined Server Utilization |
|---|---|---|---|---|
| App VM 708-1 | Storage Cluster 707-1 | | | 0.4 |
| App VM 708-2 | Storage Cluster 707-1 | | | 0.4 |
| App VM 708-3 | Storage Cluster 707-1 | | | 0.4 |
| App VM 708-4 | Storage Clusters 707-1, 707-2, 707-3 | | | 0.7 |
| App VM 708-5 | Storage Cluster 707-2 | | | 0.5 |
| App VM 708-6 | Storage Cluster 707-2 | | | 0.4 |
| App VM 708-7 | Storage Cluster 707-3 | | | 0.4 |
| App VM 708-8 | Storage Cluster 707-3 | | | 0.4 |
| App VM 708-9 | Storage Clusters 707-2, 707-3 | | | 0.6 |
| VSA VM 706-1 | | Storage Cluster 707-1 | | 0.2 |
| VSA VM 706-2 | | Storage Cluster 707-1 | | 0.2 |
| VSA VM 706-3 | | Storage Cluster 707-1 | | 0.2 |

TABLE 1-continued

| | | | |
|---|---|---|---|
| VSA VM 706-4 | | Storage Cluster 707-2 | 0.2 |
| VSA VM 706-5 | | Storage Cluster 707-2 | 0.2 |
| VSA VM 706-6 | | Storage Cluster 707-2 | 0.2 |
| VSA VM 706-7 | | Storage Cluster 707-2 | 0.2 |
| VSA VM 706-8 | | Storage Cluster 707-2 | 0.2 |
| VSA VM 706-9 | Storage 705B-1 | Storage Cluster 707-3 | 0.2 |
| VSA VM 706-10 | Storage 705B-2 | Storage Cluster 707-3 | 0.2 |
| VSA VM 706-11 | Storage 705B-3 | Storage Cluster 707-3 | 0.2 |
| VSA VM 706-12 | Storage 705B-4 | Storage Cluster 707-3 | 0.2 |
| Storage Cluster 707-1 | Storage Array 704-1 | Min VM: 3 Max VM: 3 | 0.6 |
| Storage Cluster 707-2 | Storage Array 704-2 | Min VM: 3 Max VM: 5 | 1.0 |
| Storage Cluster 707-3 | Storage 705B-1, 705B-2, 705B-3, 705B-4 | Min VM: 4 Max VM: 4 | 0.8 |

Configuration of Servers

| Server | Connected to: | Maximum Utilization Capacity | Maximum Storage Cluster Utilization |
|---|---|---|---|
| Server 702-1 | Storage Array 704-1 | 1.0 | 0.5 |
| Server 702-2 | Storage Array 704-1 Storage Array 704-2 | 1.0 | 0.5 |
| Server 702-3 | Storage Array 704-1 Storage Array 704-2 | 1.0 | 0.5 |
| Server 702-4 | Storage Array 704-2 | 1.0 | 0.5 |
| Server 702-5 | Storage Array 704-2 | 1.0 | 0.5 |
| Server 702-6 | Storage Array 704-2 | 1.0 | 0.5 |
| Server 705A-1 | Storage Array 704-1 Storage 705B-1 | 1.0 | 0.5 |
| Server 705A-2 | Storage 705B-2 | 1.0 | 0.5 |
| Server 705A-3 | Storage 705B-3 | 1.0 | 0.5 |
| Server 705A-4 | Storage 705B-4 | 1.0 | 0.5 |

After determining the server utilizations and the maximum utilization capacities, the virtual machine manager 710 begins by defining a first placement plan for the VSA virtual machines 706 by, for example, performing block 302 of method 300 or 402 of method 400. Accordingly, the virtual machine manager 710 first places VSA virtual machines 706-9, 706-10, 706-11 and 706-12, on servers 705A-1, 705A-2, 705A-3, and 705A-4, respectively, because those VSA virtual machines each use a storage (705B-1, 705B-2, 705B-3, and 705B-4, respectively) that is connected to a single server.

Next, the virtual machine manager 710 places the remaining VSA virtual machines on servers connected to storage assets used by the respective VSA virtual machine to support a storage cluster. Starting with the VSA virtual machines of storage cluster 707-1, the required minimum of three VSA virtual machines are placed on different servers, resulting in VSA virtual machine 706-1 placed on server 702-1, VSA virtual machine 706-2 placed on server 702-2, and VSA virtual machine 706-3 placed on server 702-3.

Next, the virtual machine manager 710 places VSA virtual machines supporting storage cluster 707-2. The storage cluster 707-2 requires a minimum of three VSA virtual machines, which would each have a server utilization of one-third (0.33), owing to the server utilization of storage cluster 707-2, which is 1.0, divided among three VSA virtual machines. The virtual machine manager 710 attempts to place such a VSA virtual machine on the server having the highest available utilization capacity that also has at least one virtual machine placed thereon, which in the present illustration is servers 702-2 and 702-3 (each have VSA virtual machines having server utilizations of 0.2 from storage cluster 707-1). However, placing a VSA virtual machine with 0.33 server utilization on either server 702-2 or 702-3 would exceed the maximum storage cluster utilization of 0.5 for those servers. Accordingly, the virtual machine manager 710 can increase the number of VSA virtual machines supporting storage cluster 707-2 to four VSA virtual machines, each of which has a reduced server utilization of 0.25. Accordingly, the virtual machine manager 710 places the VSA virtual machine 706-4 on server 702-2, VSA virtual machine 706-5 on server 702-3, VSA virtual machine 706-6 on server 702-4, and VSA virtual machine 706-7 on server 702-5. The first placement plan after placing VSA virtual machines 706 is presented in Table 2.

TABLE 2

First Placement Plan

| Server | VSA VM | Total Server Utilization |
|---|---|---|
| Server 705A-1 | VSA VM 706-9 | 0.2 |
| Server 705A-2 | VSA VM 706-10 | 0.2 |
| Server 705A-3 | VSA VM 706-11 | 0.2 |
| Server 705A-4 | VSA VM 706-12 | 0.2 |
| Server 702-1 | VSA VM 706-1 | 0.2 |
| Server 702-2 | VSA VM 706-2 VSA VM 706-4 | 0.45 |
| Server 702-3 | VSA VM 706-3 VSA VM 706-5 | 0.45 |
| Server 702-4 | VSA VM 706-6 | 0.25 |
| Server 702-5 | VSA VM 706-7 | 0.25 |
| Server 702-6 | None | None |

The virtual machine manager 710 then defines a second placement plan that places application virtual machines 708 by performing, for example, block 304 of method 300 or 404 of method 400. For example, the virtual machine manager 710 places application virtual machine 708-4 first (owing to its highest server utilization among application virtual machines), on server 705A-1, because server 705A-1 already holds VSA virtual machine 706-9 supporting storage cluster 707-3, and storage cluster 707-3 is used by the application virtual machine 708-4. After placing the remaining application virtual machines 708 in descending order of server utilization, the second placement plan is as presented in Table 3.

TABLE 3

First Placement Plan and Second Placement Plan

| Server | VSA VM | Total Server Utilization |
|---|---|---|
| Server 705A-1 | VSA VM 706-9 App VM 708-4 | 0.9 |
| Server 705A-2 | VSA VM 706-10 App VM 708-1 | 0.6 |
| Server 705A-3 | VSA VM 706-11 App VM 708-2 | 0.6 |
| Server 705A-4 | VSA VM 706-12 App VM 708-3 | 0.6 |

TABLE 3-continued

First Placement Plan and Second Placement Plan

| Server | VSA VM | Total Server Utilization |
|---|---|---|
| Server 702-1 | VSA VM 706-1 | 0.8 |
| | App VM 708-9 | |
| Server 702-2 | VSA VM 706-2 | 0.85 |
| | VSA VM 706-4 | |
| | App VM 708-6 | |
| Server 702-3 | VSA VM 706-3 | 0.85 |
| | VSA VM 706-5 | |
| | App VM 708-7 | |
| Server 702-4 | VSA VM 706-6 | 0.75 |
| | App VM 708-5 | |
| Server 702-5 | VSA VM 706-7 | 0.65 |
| | App VM 708-8 | |
| Server 702-6 | None | None |

After the first and the second placement plans have been defined, the virtual machine manager 710 deploys the VSA virtual machines 706 and the application virtual machines 708 accordingly, by performing, for example, block 306 of method 300 or 406 of method 400. The deployment may include migrating the VSA virtual machines 706 and/or the application virtual machines 708. After deploying the virtual machines according to the first and second plans, the virtual machine manager 710 can reduce the power of server 702-6, by performing, for example, block 408 of method 400.

In view of the foregoing description, it can be appreciated that virtual machines supporting storage clusters and application virtual machines can be consolidated to enable power savings on servers, while providing for high availability, fault tolerance, and quality of service.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

We claim:

1. A method comprising:
   defining a first placement plan by placing each virtual storage appliance (VSA) virtual machine of a plurality of VSA virtual machines on a server of a plurality of servers that is connected to a storage asset used by the each VSA virtual machine to support a storage cluster, placing VSA virtual machines supporting a same storage cluster on different servers of the plurality of servers, and placing the plurality of VSA virtual machines on servers with virtual machines before servers without virtual machines;
   defining a second placement plan by placing an application virtual machine on a server of the plurality of servers that has available utilization capacity for the application virtual machine and has virtual machines in preference over servers without virtual machines; and
   deploying the plurality of VSA virtual machines and the application virtual machine according to the first placement plan and the second placement plan, respectively.

2. The method of claim 1, wherein the defining the first placement plan is performed prior to the defining the second placement plan.

3. The method of claim 1, further comprising reducing a power usage of a first subset of the plurality of servers, wherein the deploying includes migrating at least some of the plurality of VSA virtual machines or the application virtual machine from the first subset of the plurality of servers to a second subset of the plurality of servers.

4. The method of claim 1, further comprising:
   determining a server utilization of each VSA virtual machines;
   determining a server utilization of the application virtual machine; and
   determining a maximum utilization capacity of each server of the plurality of servers.

5. The method of claim 4, wherein the defining the first placement plan and the defining the second placement plan each include a rule that limits a total server utilization of each server to less than or equal to a maximum utilization capacity of the each server.

6. The method of claim 1, wherein each server of the plurality of servers has a maximum storage cluster utilization,
   the server utilization of each of the VSA virtual machines supporting the same storage cluster varies inversely with a number of the VSA virtual machines supporting the same storage cluster, and
   the number of the VSA virtual machines supporting the same storage cluster is adjusted between a minimum for fault tolerance and a maximum by the defining the first placement plan so that a respective maximum storage cluster utilization is satisfied for at least one server of the plurality of servers.

7. The method of claim 1, wherein the defining the first placement plan places a VSA virtual machine with a single server placement option prior to placing a VSA virtual machine with a multiple server placement options, wherein the VSA virtual machine with the single server placement option uses a storage asset connected to a single server and the VSA virtual machine with multiple server placement options uses a storage asset connected to multiple servers.

8. The method of claim 1, wherein the application virtual machine is one of a plurality of application virtual machines,
   the defining the second placement plan places each application virtual machine of the plurality of application virtual machines in turn by decreasing order of server utilizations of the plurality of application virtual machines, and
   the defining the second placement plan places each application virtual machine on a server associated with a storage cluster used by the each application virtual machine if the server associated with the storage cluster used by the each application virtual machine has available utilization capacity for the each application virtual machine, or else places the each application virtual machine on a server having a highest utilization capacity among the plurality of servers and has at least one other virtual machine.

9. The method of claim 1, further comprising:
   monitoring for changes of the plurality of VSA virtual machines or the application virtual machine,
   redefining the first placement plan or the second placement plan based on the changes, and
   deploying the plurality of VSA virtual machines and the application virtual machine according to the redefined first placement plan or the redefined second placement plan.

10. An apparatus comprising:
    a processing resource;
    a non-transitory machine readable medium storing instructions that, when executed, cause the processing resource to:
    define a first placement plan that includes placement of:

each virtual storage appliance (VSA) virtual machine of a plurality of VSA virtual machines on a server, of a plurality of servers, that is connected to a storage asset, of a plurality of storage assets, used by the each VSA virtual machine, VSA virtual machines supporting a same storage cluster on different servers, and each VSA virtual machine on servers with virtual machines in favor of servers without virtual machines;

define a second placement plan that includes placement of:

each application virtual machine of a plurality of application virtual machines on the plurality of servers, in turn by decreasing order of server utilizations of the application virtual machines, and each application virtual machine on servers with virtual machines in favor of servers without virtual machines, apply server utilization rules to the first placement plan and the second placement plan; and deploy the plurality of VSA virtual machines and the plurality of application virtual machines on the servers according to the first placement plan and the second placement plan, respectively.

11. The apparatus of claim 10, wherein the planner module defines the second placement plan to place each of the application virtual machines on a server associated with a storage cluster used by the each application virtual machine if the server associated with the storage cluster used by the each application virtual machine has available utilization capacity for the each application virtual machine, or else to place the each application virtual machine on a server having a highest utilization capacity among the plurality of servers and has at least one other virtual machine.

12. The apparatus of claim 10, further comprising a utilization determination module to:

determine a server utilization of each VSA virtual machine;

determine a server utilization of each application virtual machine;

determine a maximum utilization capacity of each server of the plurality of servers; and normalize the maximum utilization capacity of each of the plurality of servers, the server utilization of each of the plurality of VSA virtual machines, and the server utilization of the appliance virtual machine by a lowest maximum utilization capacity of the plurality of servers, wherein the server utilization rules are based on the normalized maximum utilization capacity of each of the plurality of servers and a maximum storage cluster utilization of each of the plurality of servers.

13. The apparatus of claim 10, further comprising:

a power reduction module to reduce a power usage of a subset of servers; and a monitor module to:

monitor for a change of the plurality of VSA virtual machines, the plurality of application virtual machines, or the plurality of servers, and redefine the first placement plan or the second placement plan based on the change.

14. The apparatus of claim 10, wherein at least one server of the plurality of servers has a maximum storage cluster utilization that is a limitation on a sum of server utilizations attributable to VSA virtual machines placed on the at least one server.

15. The apparatus of claim 10, wherein the instructions that cause the processing resource to define the first placement plan includes adjusting a number of VSA virtual machines supporting a particular storage cluster between a minimum number associated with fault tolerance and a maximum number, wherein one of the VSA virtual machines supporting the particular storage cluster is placed on the at least one server and the adjusting causes a server utilization of the one of the VSA virtual machines to comply with the maximum storage cluster utilization of the at least one server.

16. The apparatus of claim 15, wherein the server utilization of the one of the VSA virtual machines varies inversely with the number of VSA virtual machines supporting the particular storage cluster.

17. A non-transitory machine readable medium encoded storing instructions that, when executed by a processor of a processor-based system, cause the processor-based system to:

define one placement plan that places each virtual storage appliance (VSA) virtual machine of a plurality of VSA virtual machines on a server that is connected to a storage asset used by the each VSA virtual machine, that places each VSA virtual machines associated with a same storage cluster on different servers, and that places VSA virtual machines in favor of servers with at least one virtual machine over servers without virtual machines; and define another placement plan that places each of a plurality of application virtual machines on a server associated with a storage cluster used by the each application virtual machine if the server associated with the storage cluster has available utilization capacity, or else places the application virtual machines in turn by decreasing order of respective server utilizations on a server having available utilization capacity.

18. The non-transitory machine readable medium of claim 17, further comprising instructions that, when executed by the processor, cause the processor-based system to:

deploy the plurality of VSA virtual machines and the plurality of application virtual machines according to the one placement plan and the another placement plan, respectively;

detect changes to the plurality of VSA virtual machines or the plurality of application virtual machines; and define at least one redefined placement plan in response to the changes.

19. The non-transitory machine readable medium of claim 17, further comprising instructions that, when executed by the processor, cause the processor-based system to:

adjust a number of the VSA virtual machines associated with the same storage cluster between a minimum number associated with fault tolerance and a maximum number to cause a server utilization of each of the VSA virtual machines associated with the same storage cluster to comply with maximum storage cluster utilizations of the different servers, wherein the server utilization of each of the VSA virtual machines associated with the same storage cluster varying inversely with the number of the VSA virtual machines.

* * * * *